June 22, 1948. K. KASSCHAU 2,443,770
ELECTRIC REGENERATIVE TRANSMISSION SYSTEM
Filed Feb. 6, 1943 3 Sheets-Sheet 3

INVENTOR
Kenneth Kasschau
BY
ATTORNEY

Patented June 22, 1948

2,443,770

UNITED STATES PATENT OFFICE 2,443,770

ELECTRIC REGENERATIVE TRANSMISSION SYSTEM

Kenneth Kasschau, Fairlawn, N. J.

Application February 6, 1943, Serial No. 475,038

18 Claims. (Cl. 180—65)

This invention relates to energy transmission systems and is generally applicable to energy transmission systems employing electric motor drive and subjected to service conditions requiring frequent acceleration and deceleration of the driven body. A specific field of application is that of gas-electric driven urban cars, and the present embodiment, hereinafter described, illustrates this particular application.

The capacity of a flywheel to maintain nearly constant rotative speed of a shaft subjected to rapid fluctuations in torque or load, has long been recognized. In such applications, the fluctuations, while of large magnitude when compared to the average condition, represent quantities of energy which are only a small fraction of the average total energy stored in the flywheel. This condition is dictated by the premise upon which this use of the flywheel is predicated; namely, to obtain relatively constant speed.

Only recently has the flywheel been employed as an energy reservoir wherein the energy variation from maximum to minimum is a relatively large percentage of the average energy content of the flywheel. When employed in this manner, the flywheel is capable of accumulating large amounts of energy without exceeding reasonable values of weight or speed. With this in mind, it becomes feasible to employ a flywheel to maintain relatively constant total kinetic energy in a closed system. Thus, in a system wherein the driven body is subject to large fluctuation in kinetic energy content, the addition of a suitable flywheel makes it possible to retain the energy within the system when it becomes necessary to reduce the kinetic energy in the driven body, rather than dissipate the energy to effect the desired change in the driven member.

This type of problem is exemplified by the service conditions under which urban vehicles operate, wherein the forward speed of the vehicle is continually varied between zero and some maximum value. Accordingly, this results in alternate accumulation and removal of vehicle kinetic energy. In accordance with prior practice, this removal of vehicle kinetic energy is accomplished by dissipation as heat generated in the braking mechanism. By addition of a flywheel, the overall kinetic energy of the system may be kept constant by removing it from the vehicle to the flywheel. It is then available for further use by returning it from the flywheel to the vehicle.

It is a fundamental tenet of this application that the energy transmission means between the vehicle and the flywheel must be capable of infinite ratio variation including 1:0 ratio wherein the vehicle remains at rest despite flywheel rotation. This follows from the realization that, since the flywheel absorbs energy by increased rotative speed, the decrease of vehicle speed is accompanied by proportionate increase in the speed of the flywheel to which the energy is being transferred, and that maximum flywheel speed is attained when the vehicle has come to rest. It is seen that the electric transmission as currently used in numerous "gas-electric" buses is inherently an infinitely variable transmission and hence may be employed to obtain the benefits of the flywheel energy accumulator. Accordingly, one object of this invention is to provide an electric transmission whereby the energy heretofore wasted in the braking mechanism is stored in the flywheel for subsequent use upon starting up.

It may be seen that the transfer of energy from vehicle to flywheel is accomplished by employing the conventional driving motor as a braking generator to supply current to the conventional generator operated temporarily as a motor. Inasmuch as this braking generator is being driven (by the vehicle) at a diminishing rate, it follows that the voltage developed in the circuit will also decrease. Concurrently, the flywheel driving motor is being accelerated as the flywheel accumulates energy, and thus its counter electromotive force tends to increase. In order to obtain electrical balance of the circuit, it is essential to vary the counter electromotive force of the flywheel motor with the applied voltage. Accordingly, another object of this invention is to provide novel and practical means whereby the counter electromotive force of the motor is automatically adjusted to the desired balance with the applied voltage.

While the above introduction has provided a summary of the problem, and has stated the general objects of the invention, further objects and a more thorough understanding of the details may be obtained by the reading of the following description and a study of the attached drawings, in which.

Figure 1:
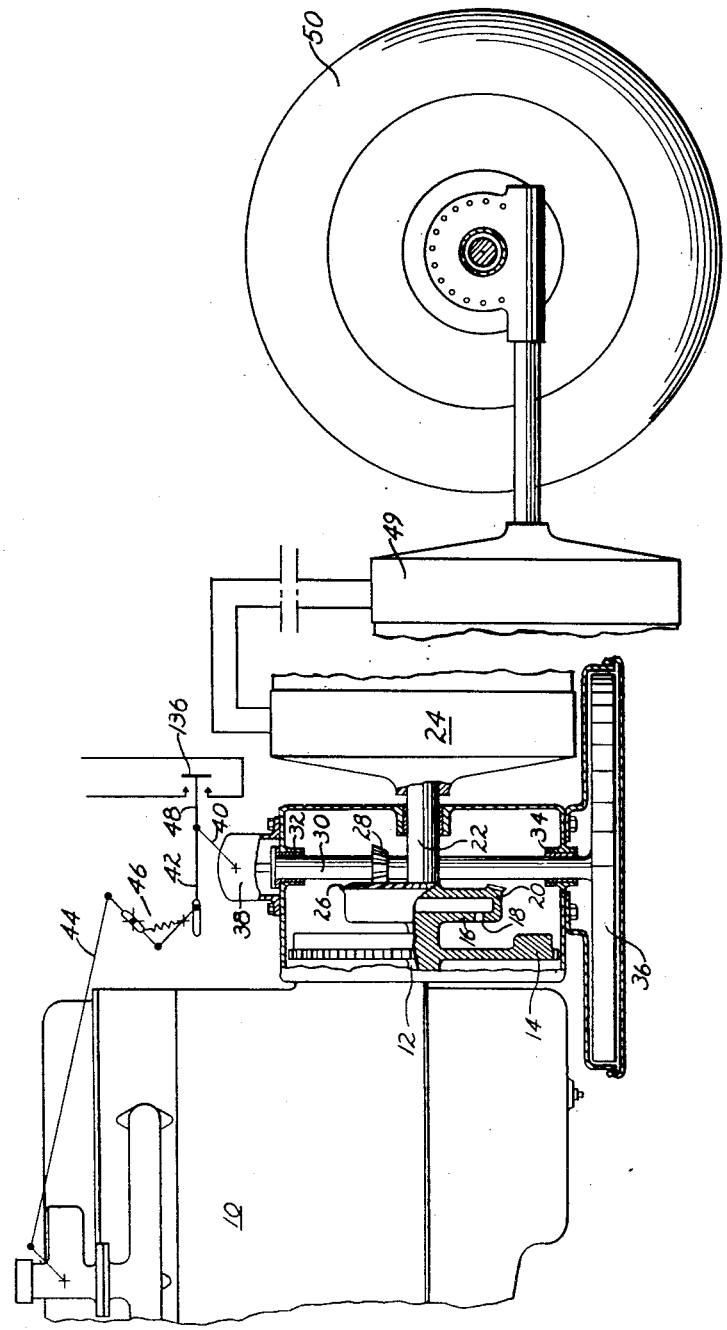
Fig. 1 is a view of the installation of the flywheel in the engine-generator combination.

In Fig. 1, 10 designates the vehicle engine having a crankshaft 12 to which is attached the conventional flywheel 14. Secured to the rear face of the flywheel is the driving member 16 of an over-running clutch or "free-wheel" unit, shown here as of the cam and roller type where 18 designates the roller. The driven member 20 is secured to shaft 22, which is the armature shaft of the generator 24. Attached to the driven member 20 of the free-wheel unit is a flywheel driving gear 26 meshing with the flywheel shaft gear 28 secured to shaft 30, which is supported by bearings 32 and 34, and at the lower end of which is mounted the accumulator flywheel 36. The axis of flywheel 36 is vertical in order that gyroscopic action of this high speed, high inertia flywheel does not affect or hinder the maneuverability of the vehicle. The flywheel 36 is restrained to rotation in direct proportion to the speed of the generator 24, the ratio being determined by the gears 26 and 28. It is apparent that the over-running clutch 16 permits transmission of power from the engine to the generator, but allows the flywheel to be accelerated above the engine speed without being forced to also accelerate the engine.

The upper end of the shaft 30 is provided with means for driving a governor 38 having an arm 40. Connected to this arm is a control link 42 which is jointed to the carburetor throttle arm 44 through toggle linkage 46. This toggle linkage is so adjusted as to open the throttle when the flywheel falls below its minimum desired operating speed and to return the throttle to the idle position when flywheel speed rises a slight amount above said minimum. By this means the engine is operated only at full throttle where fuel economy approximates its maximum value. Also, by this linkage, the engine is allowed to maintain flywheel speed at or near its minimum value during periods of prolonged idling or prolonged operation at constant speed.

Figure 2:
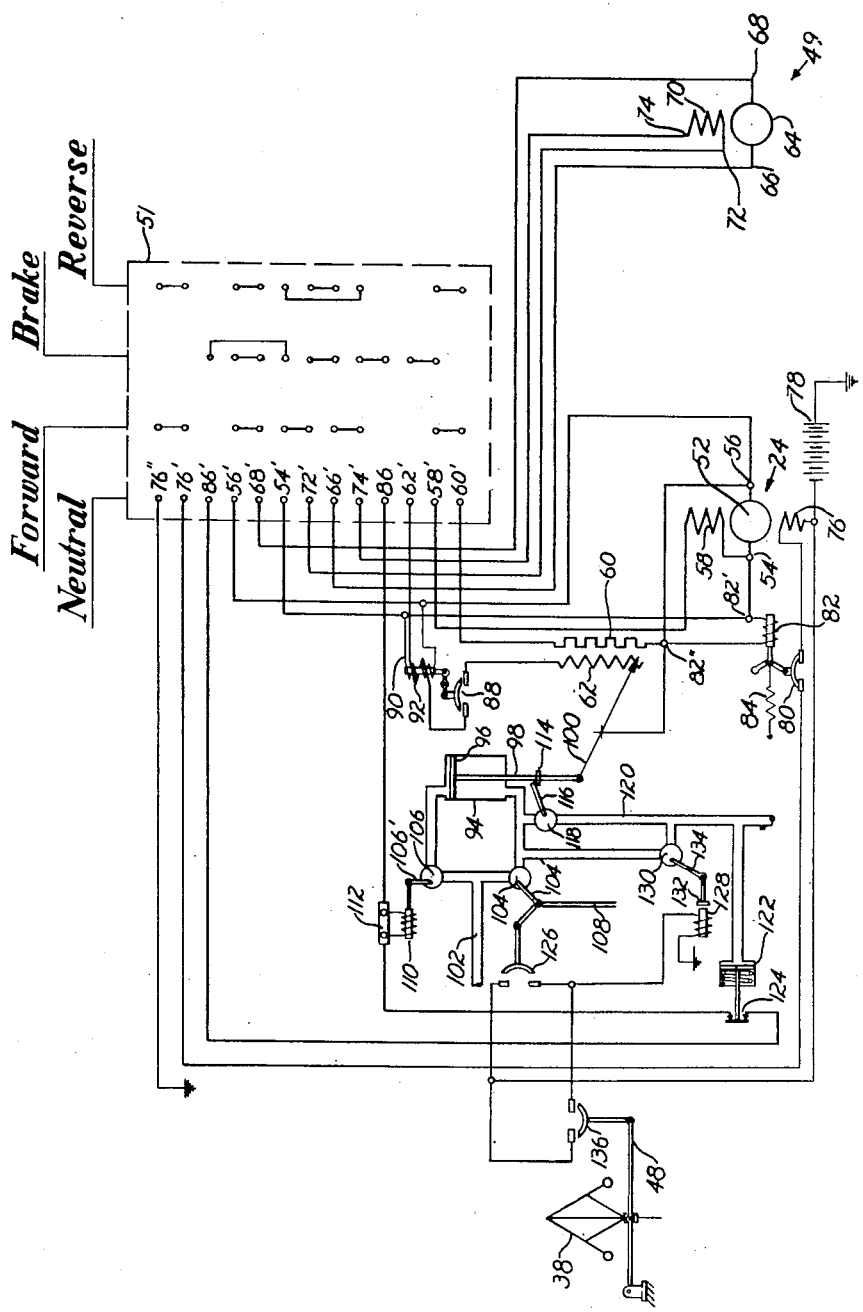
Fig. 2 is a diagrammatic sketch of the complete electrical circuit with control elements.

The generator 24 supplies electric energy to a motor 49 which is drivably connected to the wheels 50 of the vehicle. In Fig. 2 may be seen the entire diagrammatic representation of the electrical transmission with control elements. For convenience in following the diagram, all primary electrical connections to be made in the various operational phases (neutral, forward, reverse, and brake) have been enclosed within one major control box 51. Secondary electrical contacts (such as limit switches, etc.) have been included in appropriate positions in the circuit diagram.

In the drawing, the generator is shown as having an armature 52 with terminals 54 and 56, and a shunt field 58 connected to terminal 58' in the control box 51. The shunt field is selectively connected across the terminals 54 and 56 through a ballast resistance 60 or a variable resistance 62 by control box terminals 60' and 62' respectively. The vehicle driving motor 49, of the series-wound type, is represented with an armature 64, having terminals 66 and 68, and a series field 70 having terminals 72 and 74. In addition to this main transmission circuit, the generator includes a teaser field 76 energized from the vehicle storage battery 78 when selected positions of the control lever (not shown in diagrammatic representation of control box 51) close contacts 76' and 76". Included in the teaser field circuit is circuit breaker 80 operatively dependent upon the voltage existing in the main circuit as shown by parallel connection of its solenoid member 82 with the generator at terminals 82' and 82".

Selection of the "forward" position of the control lever closes the teaser field contacts 76'—76", energizing teaser field 76 from battery 78 and thus causing the generator to build up voltage at armature terminals 54 and 56, thereby energizing the shunt field 58 through ballast resistance 60, the circuit having been completed by closing of contacts 58' and 60' by a control lever (not shown). When the generator voltage has reached a predetermined value the circuit breaker 80 opens the teaser field circuit through energizing of solenoid 82 to overcome breaker spring 84. This value of voltage is determined as the voltage at which the generator will satisfactorily complete the building up process without external excitation.

Concurrent with the closing of the generator shunt and teaser field circuits, the control lever completes the internal motor circuit between the armature 64 and the field 70 by joining of contacts 66' and 74'; the external motor to generator circuit being completed by joining of contacts 54'—72' and 56'—68'. Effectively, these simultaneous connections produce a series motor having external terminals 68 and 72 applied across the generator terminals 54 and 56 by the paired joining of contacts 54', 72' and 56', 68'.

To achieve backward motion of the vehicle the connections are similar to those of forward position, with the exception that the relative direction of current flow through motor field and armature must be reversed. This reversal is accomplished by the control-box contacts such that movement of the control lever to the "reverse" position now joins motor armature terminal 66' to field terminal 72' and motor field terminal 74' to generator terminal 54'. The resultant series motor, having external terminals 68 and 74, is applied across generator terminals 54 and 56 through paired joining of contacts 54'—74' and 56'—68'. Inasmuch as all other connections are identical with those of the forward position, it is seen that the current flow through the motor field has now been reversed with respect to that through the armature, thus achieving reversal of motor rotation.

In the braking phase of transmission operation the motor 49 operates as a braking generator supplying current to the flywheel driving motor 24 (normally the engine-driven generator). It will at once be seen that this condition necessitates reversal of field to armature relation in the motor in order to obviate reversal of the field polarity due to reversed current flow. Therefore, in the braking position of the control, terminal 66 of armature 64 is connected to terminal 72 of series field 70, instead of terminal 74 as in the forward position of the control, thereby reversing the connections of the series field 70. As shown in Fig. 2, the resulting connections established by the control lever in its braking position provide a series generator having armature 64 and field 70 with generator terminals 68 and 74, the former being connected to flywheel motor terminal 56 and the latter to terminal 54 through braking circuit terminals 86 and 86' whose function will be explained in subsequent paragraphs dealing with the braking control mechanism.

In order to prevent "building up" of the flywheel motor 24 in advance of the braking generator 49, thus precluding braking of the vehicle, a solenoid operated switch 88 is included in the field circuit of the flywheel motor 24 when the control is in the braking position. This switch is restrained to the open position by a spring (not shown), and is closed only when the voltage across terminals 54, 56 has risen to a predetermined value, due to building up of the braking generator. Attainment of this predetermined voltage at terminals 54 and 56 permits sufficient current to flow through the voltage winding 90 to overcome the spring tension, closing switch 88 and completing the flywheel motor field circuit, thereby permitting current to flow through the solenoid current coil 92 and maintaining the field circuit until the braking cycle is completed.

Since the braking voltage, i. e. the generated voltage of the braking generator 49, decreases with vehicle speed, it is essential to automatically adjust the flywheel motor generated voltage or counter electromotive force to maintain braking current. This is accomplished by a servo unit operating on conventional air brake pressure and comprising a cylinder 94 and piston 96. The piston rod 98 of this unit is linked with a variable resistance control arm 100 so as to reduce the field strength of the flywheel motor (thereby increasing braking current) with upward motion of the piston 96. The servo unit is of the balanced pressure type receiving its air pressure from the air receiver (not shown) by means of a supply pipe 102 through two pressure reducing valves 104 and 106 whose outlet pressures may be controlled through arms 104' and 106' respectively. Adjustment of the arm 104' is controlled by a link 108 attached to the vehicle brake pedal, thus permitting variations in the discharge pressure from reducing valve 104 in accordance with brake pedal depression. Adjustment of arm 106' is controlled by a solenoid 110 connected across a shunt 112 which is interposed in the main braking circuit through the above mentioned contacts 86—86', thus causing the discharge pressure from the reducing valve 106 to vary in accordance with the braking current (which is directly proportional to braking effort). In other words, a given braking current or braking effort is produced by a given brake pedal depression. Accordingly, it may be seen that any depression of the brake pedal produces a proportionate pressure on the underside of the piston 96 forcing it upward and simultaneously reducing the motor field strength by motion of arm 100. The attendant increase in braking current displaces the arm 106', increasing the pressure on the upper side of the piston 96, until such time as a balance is reached with that on the underside. The field adjustment then remains constant until the balance is disturbed by readjustment of the brake pedal or change in the braking voltage due to changed vehicle speed. If, for instance, the pedal depression is maintained constant, while bringing the vehicle to rest, it will be seen that a temporary decrease in the braking current, due to the decreasing braking voltage, will be followed by a decreased pressure on the upper side of the piston 96, permitting the piston to travel upward until the braking current has again been restored to normal, when balance is again obtained.

Inasmuch as the braking voltage decreases with vehicle speed, and since the flywheel motor counterelectromotive force reaches a minimum value dependent upon motor speed and minimum field strength, it is apparent that a minimum speed exists at which braking is possible. Vehicle deceleration must then be completed by friction brakes and the electrical braking circuit must be broken to prevent reversal of current flow. Accordingly, the rod 98 is provided with a shoulder 114 engaging a link 116 in such manner as to open valve 118 when the piston 96 has reached its uppermost position (minimum field strength).

Opening of the valve 118 applies air pressure to the conventional air brakes through a passage 120, thereby reverting to conventional brake control. Simultaneously, air pressure is supplied to a pneumatic servo unit 122 opening a switch 124 in the main braking circuit, thereby preventing current reversal.

At this point attention is called to the fact that both the braking current and the pneumatic pressure on the discharge side of valve 104 are proportional to the brake pedal depression. Accordingly, it is readily possible to design the electric and pneumatic braking systems so that equal braking effort is obtainable from each for a given brake pedal depression. When the system is so designed, the above described transfer from electric to pneumatic braking occurs without any appreciable change in the braking effort.

While normal rates of deceleration are within the capacity of the electrical transmission, it is recognized that emergency stops are encountered demanding wheel-locking braking effort, which is beyond the capacity of the electrical system. Extended depression of the brake pedal closes a switch 126 energizing a solenoid 128 from the storage battery 78, and opening a valve 130 through the motion of armature 132 and link 134, thereby applying air pressure to the air brakes through passage 120. Again, the electrical circuit is broken by servo unit 122 and switch 124 in the manner already described.

In order to prevent overspeeding of the flywheel under prolonged braking conditions, the governor 38 and link 48 are arranged to close a switch 136 when the flywheel speed approaches the limiting value, again applying the air brakes and open-circuiting the electrical brakes by energizing the solenoid 128 as described for emergency stops.

Figure 3:
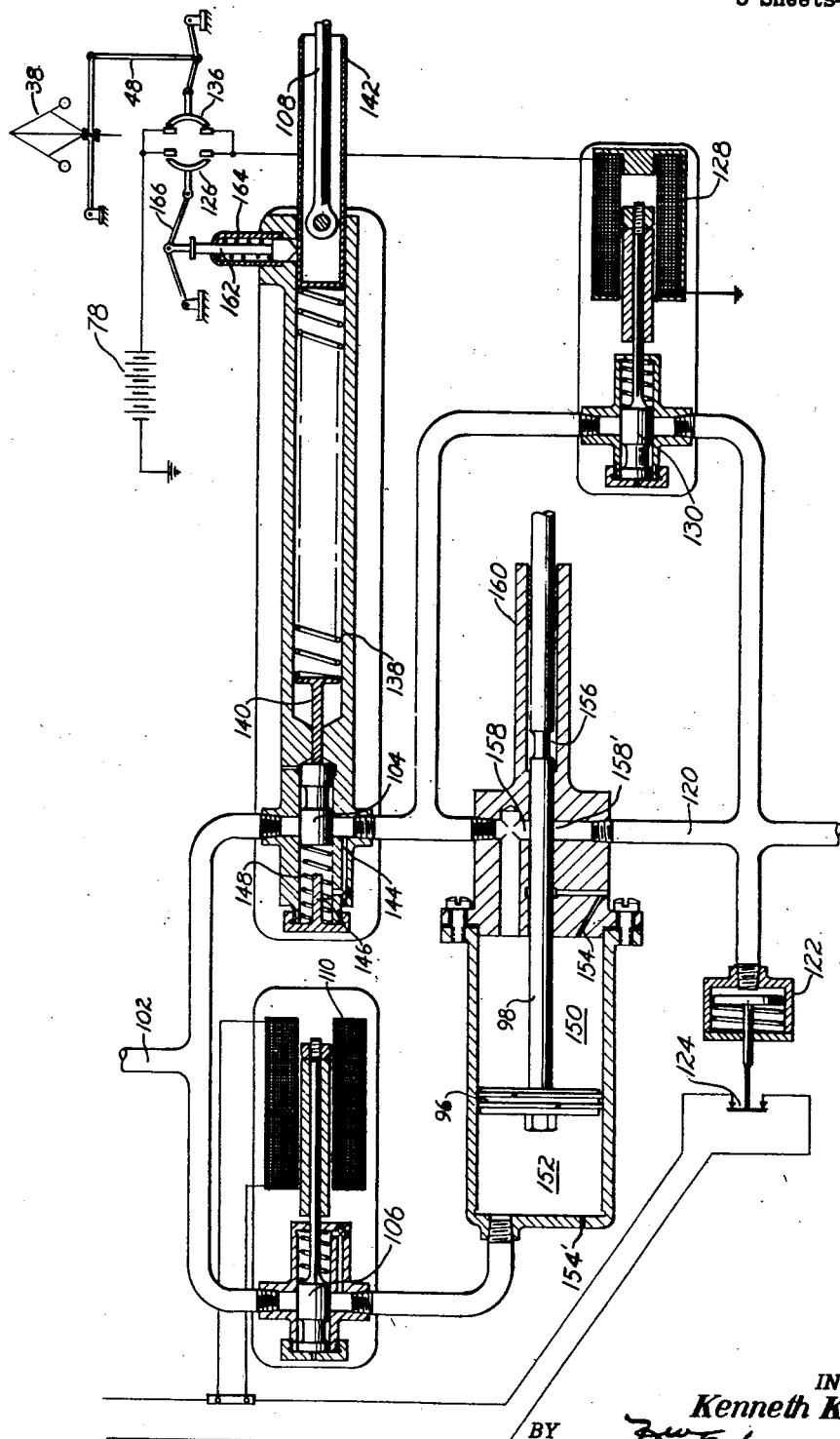
Fig. 3 is a detail view of the control elements.

In Figure 3 is shown a detail view of the field control servo unit, and in which parts already discussed are designated by numbers previously employed. Air receiver pressure is supplied to a valve 104 which is urged toward the open position (leftward) by the compression load of a spring 138, transmitted to the valve 104 by a plunger 140 and initiated by leftward motion of a plunger 142 under restraint of link 108 attached to the brake pedal. Applying valve discharge pressure to the left face of the valve 104 through a passage 144 results in a constant discharge pressure of an amount dependent upon the compression of the spring 138. Any unbalance in loads applied to the valve 104 is followed by motion of the valve to restore equilibrium. A stop is provided at 146 to prevent a sudden application of the brakes from forcing the valve 104 beyond the position where the annulus indexes with the ports, thereby rendering the valve inoperative. A spring 148 provides a light restoring force to return the valve 104 to the "off" position upon release of the brake pedal. Operation of the valve 106 is similar to that of the valve 104 except that the opening force is supplied by a solenoid 110 and varies in relation to braking current through a shunt 112 in the braking circuit as described heretofore.

The discharge pressures from the two valves are applied to chambers 150 and 152 to the right and left sides respectively of the piston 96. Thus an excess of pressure in the chamber 150 produces a leftward motion of the piston 96 and the rod 98, increasing the braking current, as heretofore described, until the pressure in the chamber 152 again balances that in the chamber 150.

It is apparent that any change in equilibrium between chambers 150 and 152 is followed by motion of the piston 96 in such a manner as to restore equilibrium. Bleed holes 154 and 154' are supplied to permit a continuous flow through the chambers 150 and 152 to allow reduction in pressures and exhausting of the chambers when necessary.

The piston rod 98 is provided with an annulus 156 engaging ports 158—158' in a housing 160 when the piston 96 has reached its leftward limit of travel. Engagement of the annulus with the ports supplies discharge pressure from the valve 104 to the passage 120 applying the conventional air brakes and opening the braking circuit by means of the servo unit 122 and the switch 124 in a manner previously described. This annulus 156 with engaging ports 158 and 158' serves the same purpose as the valve 118, shoulder 114 and link 116, shown in Fig. 2.

Emergency stops, requiring braking effort in excess of the capacity of the electrical system, are effected by extreme pedal depressions displacing the plunger 142 to the maximum leftward position, thereby disengaging the plunger 142 from contact with a plunger 162. Disengagement of these plungers permits downward motion of the plunger 162 by force of a spring 164 thereby closing the switch 126 through linkage 166. The consequent energizing of solenoid 128 from the storage battery 78 opens the valve 130, applying the conventional air brakes and opening the braking circuit through the pneumatic unit 122 and switch 124.

In the event of prolonged electric braking, as when descending long hills, the danger of overspeeding the flywheel exists. To preclude this possibility, the governor 38 is provided with a link 48 so disposed as to close the switch 136 when the flywheel speed approaches its maximum safe operating speed. Closing of the switch 136 again energizes solenoid 128 and applies friction brakes in the same manner as under emergency conditions.

While the foregoing illustration embodies the use of a single control lever for primary control of the various operational phases of the transmission, it is obvious that such disposition of controls is by no means mandatory, but is, rather, subject to the demands imposed by the specific installation. For instance, the forward and neutral positions of the transmission may be vested in the conventional accelerator pedal. The brake pedal may be employed to initiate the primary braking circuit connections as well as quantitatively control the braking effort. Although the above description illustrates the use of the transmission in a gas-electric driven urban vehicle, it is apparent that this should not be interpreted as limiting the scope of this invention, since it is applicable wherever an electric motor is employed as motive power.

As described above, the regenerative braking system consists of a series-type generator 49 connected to a shunt type motor 24 for driving the flywheel 36. It can be shown that from the standpoint of regenerative braking this is the best combination. Thus, the braking torque required to rotate a generator is a function of the product of the generator armature current and field strength. With a series-type generator, if the armature current is maintained constant, the field strength will be constant, thereby providing a constant braking force regardless of the speed of the vehicle. However, if a shunt-type generator were substituted for the series generator 49, then with constant field resistance the field strength would fall off as the vehicle speed decreased even though the armature current were maintained constant. Therefore, the substitution of a shunt-type generator would have the disadvantage that the braking torque would decrease as the vehicle slowed down unless some additional means were provided to maintain the field strength constant. Now, considering the flywheel motor 24; with a shunt-type motor as herein provided, by regulating the small field current it is possible to readily maintain a constant armature current as the vehicle slows down. However, if a series-type of motor were used, a shunt of sufficient capacity to handle full braking current would be required to regulate the series field of this motor as compared to a rheostat for controlling a shunt field.

From the above analysis it may be seen that the most desirable combination of equipment from the standpoint of regenerative braking will be one which under normal operation has a shunt generator and a series motor. When reversed for braking, the result will be a series generator in which maximum braking force is obtainable at very low speed and a shunt flywheel motor which may be easily controlled to maintain the constant braking current required. However, obviously the invention is not limited to this particular combination.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission for a vehicle, a pair of electromotive machines connected to the vehicle engine and vehicle propelling means respectively, electric connections between said machines, means to vary the relative magnitude of the generated voltages of said machines so that either machine may be driven as a generator for supplying electric energy to the other machine for operation of said other machine as a motor, said means including a member movable to adjust the field strength of the machine connected to said engine when the other machine is operating as a generator thereby controlling the magnitude of the generated current, and manually operable means for adjusting the magnitude of said generated current, said movable member being subjected to a pair of opposed forces respectively responsive to the magnitude of said generated current and to the position of said manually adjustable means.

2. In a transmission for an automotive vehicle as recited in claim 1 in which said vehicle is provided with auxiliary braking means, and means operable upon movement of said movable member to a predetermined position for applying said auxiliary braking means.

3. In a transmission for an automotive vehicle as recited in claim 1 in which said vehicle is provided with auxiliary braking means, and means operable upon movement of said manually operable means to a predetermined position for applying said auxiliary braking means.

4. In a transmission for a vehicle, a pair of electromotive machines connected to the vehicle engine and vehicle propelling means respectively, electric connections between said machines, and means to vary the relative magnitude of the generated voltages of said machines so that either machine may be driven as a generator for supplying electric energy to the other for operating said other machine as a motor, said means including means for maintaining a substantially constant generated current when the machine connected to the vehicle propelling means is operating as a generator.

5. In a transmission between the engine of a vehicle and the vehicle propelling means, an energy storing flywheel, a pair of electromotive machines, drive connections between said engine, flywheel and one of said machines such that torque may be transmitted from said engine to said flywheel and said one machine but not in the reverse direction and torque may be transmitted in either direction between said flywheel and said one machine, the other of said machines being drivably connected to said vehicle propelling means, electric connections between said machines, and means operable to vary the relative magnitude of the generated voltages of said machines so that either machine may be operated as an electric generator for supplying electric energy to the other of said machines for operating said other machine as an electric motor whereby said vehicle may be provided with driving or braking torque, the arrangement being such that, during the braking torque operation, said last-mentioned means is adapted to control the relative magnitude of said generated voltages so as to effect acceleration of said flywheel while said vehicle is decelerating.

6. In a transmission between the engine of a vehicle and the vehicle propelling means, an energy storing flywheel, a pair of electromotive machines, drive connections between said engine, flywheel and one of said machines such that torque may be transmitted from said engine to said flywheel and said one machine but not in the reverse direction and torque may be transmitted in either direction between said flywheel and said one machine, the other of said machines being drivably connected to said vehicle propelling means, electric connections between said machines, means operable to adjust the field circuit of at least one of said machines to vary the relative magnitude of the generated voltages of said machines so that either machine may be operated as an electric generator for supplying electric energy to the other of said machines for operating said other machine as an electric motor whereby said vehicle may be provided with driving or braking torque, said means including means automatically operable during the braking torque of said transmission for maintaining a substantially constant generated current, and manually operable means to vary the magnitude of said generated current.

7. In a transmission between the engine of a vehicle and the vehicle propelling means, an energy storing flywheel, a pair of electromotive machines, drive connections between said engine, flywheel and one of said machines such that torque may be transmitted from said engine to said flywheel and said one machine but not in the reverse direction and torque may be transmitted in either direction between said flywheel and said one machine, the other of said machines being drivably connected to said vehicle propelling means, electric connections between said machines, and means operable to adjust the field circuit of at least one of said machines to vary the relative magnitude of the generated voltages of said machines so that either machine may be operated as an electric generator for supplying electric energy to the other of said machines for operating said other machine as an electric motor whereby said vehicle may be provided with driving or braking torque.

8. In a transmission between the engine of a vehicle and the vehicle propelling means, an energy storing flywheel, a pair of electromotive machines, drive connections between said engine, flywheel and one of said machines such that torque may be transmitted from said engine to said flywheel and said one machine but not in the reverse direction and torque may be transmitted in either direction between said flywheel and said one machine, the other of said machines being drivably connected to said vehicle propelling means, electric connections between said machines, means operable to vary the relative magnitude of the generated voltages of said machines so that either machine may be operated as an electric generator for supplying electric energy to the other of said machines for operating said other machine as an electric motor whereby said vehicle may be provided with driving or braking torque, the arrangement being such that, during the braking torque operation, said last-mentioned means is adapted to control the relative magnitude of said generated voltages so as to effect acceleration of said flywheel while said vehicle is decelerating, and means responsive to the speed of said flywheel for effecting high power operation of said engine at low flywheel speeds and for effecting low power engine operation at high flywheel speeds.

9. In a transmission between the engine of a vehicle and the vehicle propelling means, an energy storing flywheel, a pair of electromotive machines, drive connections between said engine, flywheel and one of said machines such that torque may be transmitted from said engine to said flywheel and said one machine but not in the reverse direction and torque may be transmitted in either direction between said flywheel and said one machine, the other of said machines being drivably connected to said vehicle propelling means, electric connections between said machines, means operable to vary the relative magnitude of the generated voltages of said machines so that either machine may be operated as an electric generator for supplying electric energy to the other of said machines for operating said other machine as an electric motor whereby said vehicle may be provided with driving or braking torque, the arrangement being such that, during the braking torque operation, said last-mentioned means is adapted to control the relative magnitude of said generated voltages so as to effect acceleration of said flywheel while said vehicle is decelerating, auxiliary brakes for said vehicle, and means operable during the braking torque operation of said transmission for interrupting said storage of energy and applying said auxiliary brakes.

10. In a transmission between the engine of a vehicle and the vehicle propelling means, an energy storing flywheel, a pair of electromotive machines, drive connections between said engine, flywheel and one of said machines such that torque may be transmitted from said engine to said flywheel and said one machine but not in the reverse direction and torque may be transmitted in either direction between said flywheel and said one machine, the other of said machines being drivably connected to said vehicle propelling means, electric connections between said machines, means operable to vary the relative magnitude of the generated voltages of said machines so that either machine may be operated as an electric generator for supplying electric energy to the other of said machines for operating said other machine as an electric motor whereby said vehicle may be provided with driving or braking torque, the arrangement being such that, during the braking torque operation, said last-mentioned means is adapted to control the relative magnitude of said generated voltages so as to effect acceleration of said flywheel while said vehicle is decelerating, auxiliary brakes for said vehicle, and means operable during the braking torque operation of said transmission for applying said auxiliary brakes.

11. In a transmission between a power means and a mass to be driven thereby, an energy storing flywheel, a pair of electromotive machines, drive connections from said power means to said flywheel and one of said machines, a drive connection from the other of said machines to said mass, electric connections between said machines, and means to vary the relative magnitude of the generated voltages of said machines so that either machine may be operated as an electric generator for supplying electric energy to the other of said machines for operating said other machine as an electric motor whereby said mass may be provided with driving or braking torque, the arrangement being such that, during the braking torque operation, said last-mentioned means is adapted to control the relative magnitude of said generated voltages so as to effect acceleration of said flywheel while said mass is decelerating, the drive connections between said power means, flywheel and one machine being such that the transmission, during its braking torque operation is effective to store energy in said flywheel without accelerating said power means.

12. In a transmission between a power means and a mass to be driven thereby, an energy storing flywheel, a pair of electromotive machines, drive connections from said power means to said flywheel and one of said machines, a drive connection from the other of said machines to said mass, electric connections between said machines, means to vary the relative magnitude of the generated voltages of said machines so that either machine may be operated as an electric generator for supplying electric energy to the other of said machines for operating said other machine as an electric motor whereby said mass may be provided with driving or braking torque, the arrangement being such that, during the braking torque operation, said last-mentioned means is adapted to control the relative magnitude of said generated voltages so as to effect acceleration of said flywheel while said mass is decelerating, the drive connections between said power means, flywheel and one machine being such that the transmission, during its braking torque operation is effective to store energy in said flywheel without accelerating said power means, and means for automatically decreasing the power output of said power means at high flywheel speeds.

13. In a transmission between a power means and a mass to be driven thereby, an energy storing flywheel, a pair of electromotive machines, drive connections from said power means to said flywheel and one of said machines, a drive connection from the other of said machines to said mass, electric connections between said machines, means to vary the relative magnitude of the generated voltages of said machines so that either machine may be operated as an electric generator for supplying electric energy to the other of said machines for operating said other machine as an electric motor whereby said mass may be provided with driving or braking torque, the arrangement being such that, during the braking torque operation, said last-mentioned means is adapted to control the relative magnitude of said generated voltages so as to effect acceleration of said flywheel while said mass is decelerating, the drive connections between said power means, flywheel and one machine being such that the transmission, during its braking torque operation, is effective to store energy in said flywheel without accelerating said power means, and means automatically operative to prevent the speed of said flywheel from becoming excessive.

14. In a transmission between a power means and a mass to be driven thereby, a pair of electromotive machines drivably connected to said power means and mass respectively, electric connections between said machines, means operable to adjust the field circuit of at least one of said machines to vary the relative magnitude of the generated voltages of said machines so that either machine may be operated as a generator for supplying electric energy to the other of said machines for operation of said other machine as an electric motor, and means automatically operable for controlling the electric output of the machine connected to said mass, when said machine is operating as a generator.

15. In a transmission between a power means and a mass to be driven thereby, a pair of electromotive machines drivably connected to said power means and mass respectively, electric connections between said machines, means operable to vary the relative magnitude of the generated voltages of said machines so that either machine may be operated as a generator for supplying electric energy to the other of said machines for operation of said other machine as an electric motor, and means responsive to the generated current of the machine connected to said mass for effecting adjustment of the field strength of the other of said machines when the machine connected to said mass is acting as a generator.

16. In a transmission for an automotive vehicle, an energy storing flywheel, a shunt-type electromotive machine, a one-way drive from the engine of said vehicle to the flywheel and to said shunt machine for driving said shunt machine as an electric generator, a series-type electromotive machine drivably connected to the vehicle propelling means, electric connections between said machines whereby said shunt machine when operating as a generator supplies electric energy to said series machine for operating said series machine as an electric motor for propelling said vehicle, and means operable to reverse the series field connection of said series machine and for controlling the field strength of said shunt machine for effecting operation of said series machine as a generator supplying electric energy to said shunt machine which in turn drives and stores energy in said flywheel.

17. In an automotive vehicle, an energy storing flywheel, an electric transmission operable to provide said vehicle with driving or braking torque, auxiliary brakes for said vehicle said transmission being effective during its braking torque operation to transfer to and store in said flywheel the kinetic energy of said vehicle, means operative at low speeds of said vehicle for interrupting said transfer of energy and applying said auxiliary brakes, and a unitary control member adjustable to control the magnitude of either braking means in accordance with the adjustment of said member.

18. In an automotive vehicle, an energy storing flywheel, a transmission operative to provide said vehicle with driving or braking torque, said transmission being effective during its braking torque operation for transferring to and storing in said flywheel the kinetic energy of said vehicle independently of the engine of said vehicle, means for interrupting said transfer of energy upon excessive flywheel speed, friction brake means operative upon occurrence of said excessive speed to provide said vehicle with braking torque substantially equal in magnitude to the braking torque prior to the changeover to friction brakes, and a unitary control member operative to control the magnitude of either braking torque.

KENNETH KASSCHAU.

REFERENCES CITED

The following references are of record in the file of this patent:

UNITED STATES PATENTS

| Number | Name | Date |
| --- | --- | --- |
| 653,264 | Scott | July 10, 1900 |
| 745,441 | Hospitalier | Dec. 1, 1903 |
| 865,812 | Powell | Sept. 10, 1907 |
| 907,907 | Sperry | Dec. 29, 1908 |
| 1,814,607 | Sanders | July 14, 1931 |
| 2,035,047 | Cotter | Mar. 24, 1936 |
| 2,093,042 | Fottinger | Sept. 14, 1937 |
| 2,118,590 | Chilton | May 24, 1938 |
| 2,196,064 | Erban | Apr. 2, 1940 |
| 2,244,216 | Pieper | June 3, 1941 |
| 2,261,019 | Chilton | Oct. 28, 1941 |
| 2,348,053 | Bowker | May 2, 1944 |